(12) United States Patent
Abou-Nasr et al.

(10) Patent No.: US 9,314,878 B2
(45) Date of Patent: Apr. 19, 2016

(54) NON-DESTRUCTIVE ALUMINUM WELD QUALITY ESTIMATOR

(71) Applicant: Ford Global Technologies, LLC, Dearborn, MI (US)

(72) Inventors: Mahmoud A. Abou-Nasr, Canton, MI (US); Dimitar Petrov Filev, Novi, MI (US); Elizabeth Therese Hetrick, Ann Arbor, MI (US); William C. Moision, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 14/024,957

(22) Filed: Sep. 12, 2013

(65) Prior Publication Data
US 2015/0069112 A1    Mar. 12, 2015

(51) Int. Cl.
| B23K 31/02 | (2006.01) |
|---|---|
| B23K 31/12 | (2006.01) |
| B23K 11/10 | (2006.01) |
| B23K 11/11 | (2006.01) |
| B23K 11/18 | (2006.01) |
| B23K 11/25 | (2006.01) |

(52) U.S. Cl.
CPC ............. *B23K 31/125* (2013.01); *B23K 11/10* (2013.01); *B23K 11/115* (2013.01); *B23K 11/185* (2013.01); *B23K 11/253* (2013.01); *B23K 11/255* (2013.01); *B23K 11/257* (2013.01); *B23K 11/258* (2013.01)

(58) Field of Classification Search
None
See application file for complete search history.

(56) References Cited

U.S. PATENT DOCUMENTS

| 3,192,474 | A | * | 6/1965 | Cherry | 324/693 |
|---|---|---|---|---|---|
| 3,389,239 | A | * | 6/1968 | Treppa et al. | 219/110 |
| 3,410,983 | A | * | 11/1968 | Deutsch et al. | 219/109 |
| 3,632,956 | A | * | 1/1972 | Herbst | 219/109 |
| 4,419,562 | A | * | 12/1983 | Jon | B23K 15/0013 219/121.62 |

(Continued)

FOREIGN PATENT DOCUMENTS

| CA | 2210896 A1 * | 8/1996 | B23K 11/02 |
|---|---|---|---|
| CN | 1220034 | 6/1999 | |

(Continued)

OTHER PUBLICATIONS

Yi et al., "Characterization of nugget nucleation quality based on the structure-borne acoustic emission signals detected during resistance spot welding process", Measurement 46 (2013) 10-53-1060.

(Continued)

*Primary Examiner* — Kiley Stoner
(74) *Attorney, Agent, or Firm* — Damian Porcari; Bejin Bieneman PLC

(57) ABSTRACT

An aluminum welding system includes a welding machine configured to weld a workpiece with an aluminum nugget and a measurement device configured to measure an attribute of at least one of the aluminum nugget and a welding process. The system further includes a processing device configured to output a weld quality signal representing a quality of an aluminum weld based at least in part on the attribute measured. A method includes measuring an attribute of at least one of an aluminum nugget forming a joint of a workpiece and a welding process, determining a quality of an aluminum weld based at least in part on the attribute measured, and outputting a weld quality signal representing the determined quality.

17 Claims, 3 Drawing Sheets

(56) References Cited

U.S. PATENT DOCUMENTS

| | | | | |
|---|---|---|---|---|
| 4,503,310 A * | 3/1985 | van Loon | | 219/98 |
| 4,503,312 A * | 3/1985 | Nakata et al. | | 219/117.1 |
| 4,562,330 A * | 12/1985 | Hamilton | | 219/110 |
| 4,605,836 A * | 8/1986 | Retfalvi et al. | | 219/130.01 |
| 4,939,335 A * | 7/1990 | Mueller | | 219/109 |
| 5,450,315 A * | 9/1995 | Stefanski | | 700/48 |
| 5,614,109 A * | 3/1997 | Cecil | B23K 11/253 | 198/341.07 |
| 5,721,415 A * | 2/1998 | Fortmann et al. | | 219/109 |
| 5,742,023 A * | 4/1998 | Fortmann | | 219/109 |
| 5,764,859 A * | 6/1998 | Kim et al. | | 706/20 |
| 5,793,011 A * | 8/1998 | Watanabe | B23K 11/115 | 219/109 |
| 6,018,729 A * | 1/2000 | Zacharia et al. | | 706/21 |
| 6,020,569 A * | 2/2000 | Cecil | B23K 11/253 | 219/109 |
| 6,072,144 A * | 6/2000 | Perryman | | 219/109 |
| 6,140,825 A * | 10/2000 | Fujii et al. | | 324/718 |
| 6,232,572 B1 * | 5/2001 | Kanjo | | 219/110 |
| 6,236,017 B1 * | 5/2001 | Smartt | B23K 9/093 | 219/130.01 |
| 6,281,465 B1 * | 8/2001 | Muller et al. | | 219/109 |
| 6,335,504 B1 * | 1/2002 | Ling | B23K 11/257 | 219/109 |
| 6,583,386 B1 * | 6/2003 | Ivkovich | | 219/130.01 |
| 6,948,369 B2 * | 9/2005 | Fleming et al. | | 73/588 |
| 7,186,947 B2 * | 3/2007 | Connally | B23K 10/00 | 219/121.72 |
| 7,244,905 B2 | 7/2007 | Das et al. | | |
| 7,259,349 B2 * | 8/2007 | Stieglbauer et al. | | 219/109 |
| 8,183,493 B2 * | 5/2012 | Batzinger et al. | | 219/109 |
| 8,544,714 B1 * | 10/2013 | Obaditch | B23K 20/123 | 228/102 |
| 8,912,786 B2 | 12/2014 | Badegruber et al. | | 324/127 |
| 2002/0008086 A1 * | 1/2002 | Fujii et al. | | 219/110 |
| 2002/0053555 A1 * | 5/2002 | Matsuyama | | 219/110 |
| 2002/0134817 A1 * | 9/2002 | Shepard | | 228/105 |
| 2002/0144984 A1 * | 10/2002 | Mori | B23K 26/03 | 219/121.64 |
| 2003/0094478 A1 * | 5/2003 | Simpson | | 228/9 |
| 2003/0234239 A1 * | 12/2003 | Lee | B23K 11/24 | 219/109 |
| 2004/0032597 A1 * | 2/2004 | Esmiller | B23K 1/0056 | 356/636 |
| 2004/0094516 A1 * | 5/2004 | De Pra | B23K 11/258 | 219/109 |
| 2004/0245315 A1 * | 12/2004 | Maev et al. | | 228/8 |
| 2004/0249495 A1 * | 12/2004 | Orozco et al. | | 700/166 |
| 2006/0260403 A1 * | 11/2006 | Waschkies | B23K 9/095 | 73/588 |
| 2008/0041827 A1 * | 2/2008 | Li et al. | | 219/109 |
| 2008/0237303 A1 * | 10/2008 | Lin et al. | | 228/103 |
| 2009/0283569 A1 * | 11/2009 | Ramaswamy | B23K 11/252 | 228/1.1 |
| 2010/0019785 A1 * | 1/2010 | Wang | G01N 27/048 | 324/696 |
| 2011/0108181 A1 * | 5/2011 | Cai | B23K 20/10 | 156/64 |
| 2011/0192827 A1 * | 8/2011 | Hwang et al. | | 219/130.01 |
| 2011/0210098 A1 * | 9/2011 | Court | B23K 11/258 | 219/117.1 |
| 2011/0284501 A1 * | 11/2011 | Wang | B23K 11/115 | 219/78.01 |
| 2011/0284508 A1 * | 11/2011 | Miura | B23K 31/125 | 219/121.64 |
| 2012/0012644 A1 * | 1/2012 | Baxter | B23K 20/121 | 228/104 |
| 2012/0091185 A1 * | 4/2012 | Ume | B23K 9/0956 | 228/1.1 |
| 2012/0125899 A1 * | 5/2012 | Oh | | 219/121.64 |
| 2012/0234805 A1 * | 9/2012 | Schwarz | B23K 26/03 | 219/121.63 |
| 2013/0026148 A1 * | 1/2013 | Aoyama et al. | | 219/124.33 |
| 2013/0048613 A1 | 2/2013 | Sigler et al. | | |
| 2013/0092663 A1 * | 4/2013 | Lee et al. | | 219/91.2 |
| 2013/0105557 A1 * | 5/2013 | Spicer | B23K 31/125 | 228/104 |
| 2013/0248505 A1 * | 9/2013 | Anayama et al. | | 219/130.01 |
| 2013/0334177 A1 * | 12/2013 | Haeufgloeckner | B23K 31/125 | 219/91.1 |
| 2014/0083191 A1 * | 3/2014 | Iwatani et al. | | 73/588 |
| 2014/0183168 A1 * | 7/2014 | Arndt | B23K 11/255 | 219/86.51 |
| 2014/0318250 A1 * | 10/2014 | Arai et al. | | 73/588 |
| 2014/0332514 A1 * | 11/2014 | Holverson et al. | | 219/130.01 |
| 2015/0069112 A1 * | 3/2015 | Abou-Nasr et al. | | 228/102 |
| 2015/0129638 A1 * | 5/2015 | Silvanus | B23K 20/1255 | 228/2.1 |

FOREIGN PATENT DOCUMENTS

| | | | | |
|---|---|---|---|---|
| DE | 102006038786 A1 * | 2/2008 | | B23K 11/257 |
| DE | WO 2008019708 A1 * | 2/2008 | | B23K 11/166 |
| DE | 102009016798 A1 * | 10/2010 | | B23K 11/11 |
| DE | WO 2010115524 A1 * | 10/2010 | | B23K 11/11 |
| DE | 102009056234 A1 * | 6/2011 | | |
| DE | 102011101751 A1 * | 12/2011 | | B23K 11/115 |
| EP | 2628561 A1 * | 8/2013 | | |
| GB | 2351811 A * | 1/2001 | | G01N 3/02 |
| WO | WO 2004/022278 A1 * | 3/2004 | | |

OTHER PUBLICATIONS

Zhao et al., "An effective quality assessment method for small scale resistance spot welding based on process parameters", NDT&E International 55 (2013) 36-41.

* cited by examiner

NON-DESTRUCTIVE ALUMINUM WELD QUALITY ESTIMATOR

BACKGROUND

Spot welding is a metal fabrication technique in which contacting metal surfaces are joined by the heat obtained from resistance to electric current. Work-pieces are held together under pressure exerted by electrodes. Typically the individual sheets are between 0.5 to 4 mm in thickness. The process uses two shaped typically copper alloy based electrodes to concentrate welding current into a small "spot" and to simultaneously clamp the sheets together. Forcing a large current through the spot will melt the metal and form the weld. After the material is heated the current is turned off allowing the melted material to cool while still under the pressure of the electrodes forming a solid "Spot" weld in that location. Testing the strength of the weld may include a destructive test or a non-destructive test. Destructive testing includes determining the amount of force necessary to separate the joined parts. Destructive tests, however, are contraindicated where destroying the workpiece is not ideal or cost-effective. Moreover, destructive tests do not allow for remedial actions to be taken during the welding process. Non-destructive testing includes identifying characteristics of the joint itself to determine its strength. Robust non-destructive tests are only available for particular substrate materials (i.e., steel), however, and not for other types of metal substrates such as aluminum.

DETAILED DESCRIPTION

An exemplary aluminum welding system includes a welding machine configured to weld a joint of a workpiece with an aluminum nugget and a measurement device configured to measure an attribute of aluminum nugget(s) joining the workpieces, attributes of a welding process, or both. The system further includes a processing device configured to output a weld quality signal representing a quality of an aluminum weld based at least in part on the attribute measured. An exemplary method includes measuring an attribute of an aluminum nugget and/or an attribute of a welding process, determining a quality of an aluminum weld based at least in part on the attribute measured, and outputting a weld quality signal representing the determined quality. The system and method disclosed herein allow for aluminum welds to be non-destructively tested.

Figure 1:
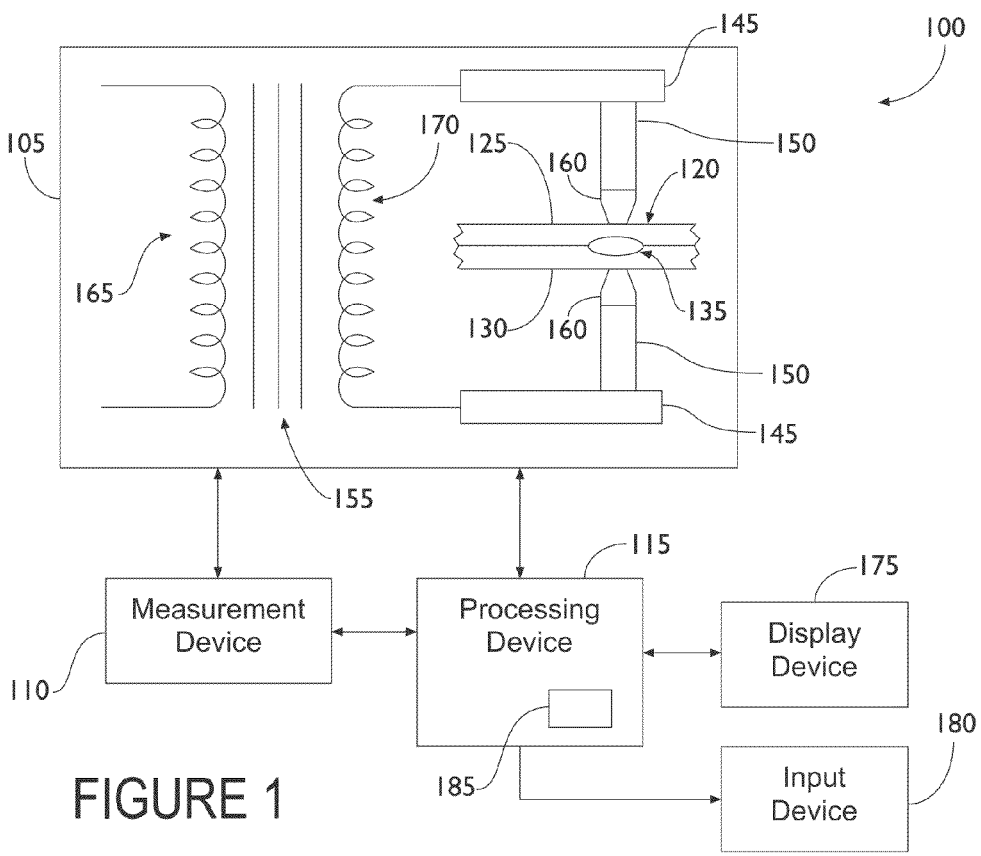
FIG. 1 illustrates an exemplary system for non-destructively testing the strength of an aluminum weld.

FIG. 1 illustrates an exemplary aluminum welding system 100 that can non-destructively determine the quality of weld formed at a joint of a workpiece. The system may take many different forms and include multiple and/or alternate components and facilities. While an exemplary system is shown, the exemplary components illustrated in the Figures are not intended to be limiting. Indeed, additional or alternative components and/or implementations may be used.

As shown in FIG. 1, the system 100 may include a welding machine 105, a measurement device 110, and a processing device 115.

The welding machine 105 may be configured to weld a joint of a workpiece 120. The workpiece 120 may include a first portion 125 and a second portion 130. While only the first portion 125 and the second portion 130 are discussed for purposes of simplicity, the workpiece 120 may include other or additional portions such as a three thickness (3T), stack-up, etc. Before welding, the first portion 125 and the second portion 130 may be separate pieces. The welding machine 105 may be configured to weld the first portion 125 to the second portion 130 by heating the first portion 125 and the second portion 130 to form an aluminum nugget 135 at a fusion zone 140 (see FIG. 2) and a weld joint. The weld machine may be configured to generate heat using an electric current. For example, in one possible implementation, the welding machine 105 may include arms or tongs 145, electrodes 150, and a transformer 155. The tongs 145 may be configured to conduct electricity from the transformer 155 to the electrodes 150. Each electrode may include an electrode tip 160 that is configured to transmit electricity through the workpiece 120 from one electrode to the other. The transformer 155 may be configured to provide a particular voltage at a particular current to the tongs 145 and electrodes 150. The transformer 155 may include a primary coil 165 inductively coupled to a secondary coil 170. A magnetic flux may be generated as current is passed through the primary coil 165. The magnetic flux may induce a current through the secondary coil 170, and the current through the secondary coil 170 may be proportional in magnitude to the current passed through the primary coil 165. For instance, the ratio of the current through the primary coil 165 to the ratio of the current through the secondary coil 170 may be proportional to the number of windings of the primary coil 165 relative to the number of windings of the secondary coil 170. The current passing through the workpiece 120 may heat the first portion 125 and the second portion 130 to form the aluminum nugget 135. Once cooled, the aluminum nugget 135 may harden to form the weld joint between the first portion 125 and the second portion 130.

The measurement device 110 may be configured to measure an attribute of the aluminum nugget 135, the first portion 125, the second portion 130, or any combination of these components that may be located at the weld joint of the workpiece 120. Examples of quality attributes may include indentation width, penetration, indentation depth, heat-affected zone (HAZ) width, width of the aluminum nugget 135, force, expulsion, thermal expansion, and the magnitude of the current or voltage applied to the workpiece 120 during the welding process. These attributes may be measured using one or more sensors or other components. For instance, the measurement device 110 may include a force transducer or servo motor configured to measure attributes associated with force, position, or nugget size. Examples of such attributes may include indentation width, indentation depth, and HAZ width. A current coil may be configured to measure the magnitude of the current applied to the workpiece 120 during the welding process. Current may be used to measure or estimate penetration, width of the aluminum nugget 135, or both. A voltmeter may be configured to measure the magnitude of the voltage applied to the workpiece 120 during the welding process. The measurement device 110 may be configured to generate and output signals representing measurements of one or more of these or other attributes.

The processing device 115 may be configured to output a weld quality signal that represents the quality of the aluminum weld based, at least in part, on the attribute or attributes measured by the measurement device 110. The processing device 115 may be configured to receive and process the signals representing the measurements that are generated by the measurement device 110. The processing device 115 may be configured to output signals, such as the weld quality signal generated by, e.g., a dynamic neural network 185, discussed below, to the display device 175, which may include, e.g., a computer monitor. The processing device 115 may be configured to receive user inputs via an input device 180, which may include a keyboard, a mouse, touchscreen display, or the like.

The processing device 115 may be configured to implement any number of signal processing operations. In some implementations, the processing device 115 may incorporate hardware configured to perform analog signal processing of the signals received from the measurement device 110 to generate the weld quality signal. In other implementations, the processing device 115 may incorporate both hardware and software configured to perform digital signal processing of the signals received from the measurement device 110 to generate the weld quality signal. Additionally or in the alternative, the processing device 115 may implement a combination of both analog and digital signal processing along with hardware and software configured to undertake such processing.

Figure 2:
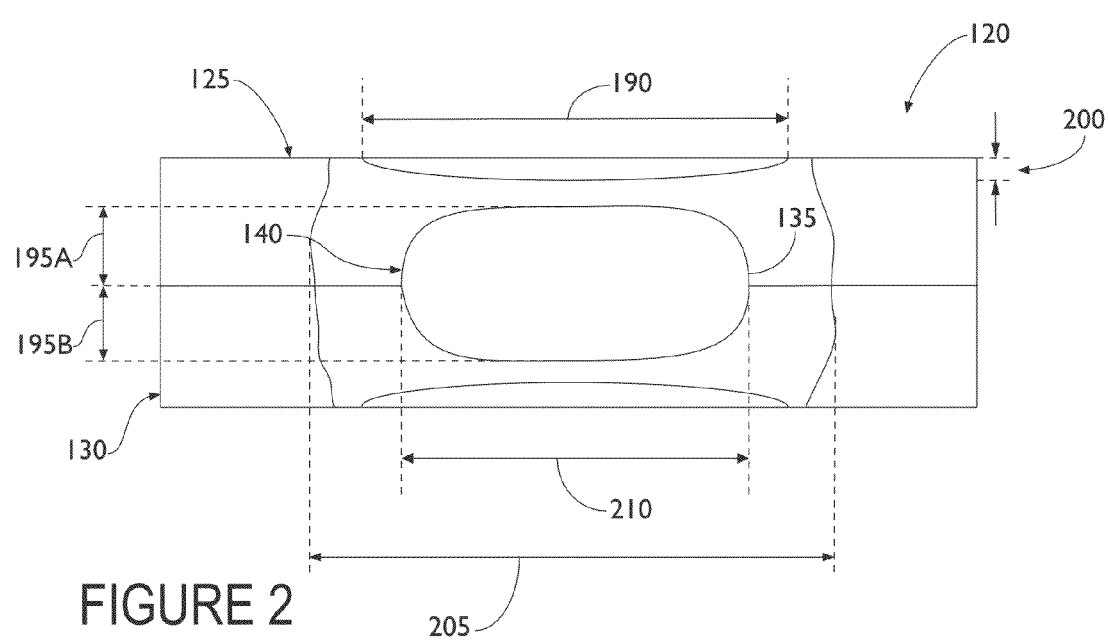
FIG. 2 is a diagram of exemplary weld attributes.

The processing device 115 may be further configured to implement a dynamic neural network 185 to generate the weld quality signal, which may represent a likelihood that the quality of the aluminum weld meets at least one predetermined criterion. The predetermined criterion may be associated with a characteristic of the workpiece 120 as a whole, of a part of the workpiece 120 such as the first portion 125 or the second portion 130, or of the aluminum nugget 135. In some instances, the predetermined criterion may be associated with a characteristic of the aluminum nugget 135 as the aluminum nugget 135 is being formed. Example characteristics may include the attributes discussed above. For instance, the characteristics may include indentation width, penetration, indentation depth, heat-affected zone (HAZ) width, width of the aluminum nugget 135, and the magnitude of the current or voltage applied to the workpiece 120. Examples of these characteristics relative to an example workpiece 120 are illustrated in FIG. 2, which is discussed below.

The processing device 115 may be configured to quantify the quality of the aluminum weld. For example, the processing device 115 may be configured to use positive numbers (e.g., numbers greater than zero) for higher quality aluminum nuggets 135 and negative numbers (e.g., numbers less than zero) for lower quality aluminum nuggets 135. In one possible approach, a positive one (+1) may represent an ideal aluminum weld while a negative one (−1) may represent an insufficient aluminum nugget 135 that must be replaced. Numbers between these two extremes (e.g., between −1 and +1) may represent varying degrees of quality. In some implementations, a positive number below +1 may indicate that the aluminum nugget 135 is not ideal but is nevertheless sufficient for the circumstances. A negative number greater than −1 may indicate that the aluminum nugget 135 meets at least one criterion but is insufficient for the circumstances and must be corrected or replaced.

Other representations of the weld quality are possible. For instance, the weld quality may be represented as a percentage from 0% to 100% where 0% may indicate that the quality is insufficient and needs to be replaced and 100% may represent an ideal aluminum weld. The values between 0% and 100% may represent varying degrees of sufficiency. For instance, values above 0% but below 50% may represent aluminum welds that meet at least one criterion but are nevertheless insufficient for the circumstances. Values above 50% but below 100% may indicate that the aluminum weld fails to meet at least one criterion but is nevertheless sufficient for the circumstances. Alternatively, the weld quality may be quantified as a number representing the number of compliant criteria. In this alternative approach, the number zero (0) may indicate that the weld fails to meet any criteria while the number four (4) may represent that the weld meets four criteria. These values may be weighted since it may be possible for some criteria to be more significant than others, depending on various circumstances. That is, meeting one criterion may increase the value by two (2) while meeting another criterion may only increase the value by one (1).

During operation, the processing device 115 may determine the quality of the weld with the dynamic neural network 185 and generate the weld quality signal accordingly. That is, the dynamic neural network 185 may be configured to output the value (e.g., +1, −1, or any value in between) representing the likely quality of the weld given the measurements by the measurement device 110. Moreover, using updated measurements and weld quality signals as feedback, the processing device 115 may be configured to control the operation of the welding machine 105 in real time. For instance, the processing device 115 may be configured to adjust one or more settings associated with the welding machine 105 to attempt to improve the quality of the aluminum weld if, for instance, the weld quality signal represents a poor weld at the joint. Example settings may include the amount of heat generated by the welding machine 105, the current through the electrodes 150, the amount of time the current is applied to the workpiece 120, force, etc.

In some instances, the processing device 115 may be configured to determine whether the quality of the aluminum weld can be improved. If so, the processing device 115 may attempt to improve the quality of the aluminum weld by controlling the welding machine 105. If the processing device 115 determines, in real time, that the quality of the aluminum weld cannot be improved, the processing device 115 may be configured to reject the weld. The processing device 115 may be configured to reject the weld if, e.g., the quality of the aluminum weld falls below a predetermined threshold. Rejecting the weld may include outputting a signal to a weld operator indicating that the weld has been rejected and that the rejected weld must be replaced. Continuing with some of the examples above, the processing device 115 may be configured to reject the weld if the quality of the aluminum weld is a negative number (e.g., below 0), below 50%, or a predetermined number of criteria have not been met.

FIG. 2 is a view of the workpiece 120 illustrating exemplary weld attributes. The first portion 125 and second portion 130, as well as the aluminum nugget 135, are illustrated in FIG. 2. The example attributes include indentation width 190, penetration 195A and 195B (collectively, 195), indentation depth 200, heat-affected zone (HAZ) width 205, and the width 210 of the aluminum nugget 135. Indentation width 190 may represent a width of a recess formed in the first portion 125 and second portion 130 of the workpiece 120 after the first portion 125 and second portion 130 have been heated as part of the welding process. Penetration 195 may represent the distance from a surface of the first portion 125 (195A) or the second portion 130 (195B) affected by the welding machine 105. In some instances, penetration 195 may refer to the height of the aluminum nugget 135 formed as a result of the welding process. Penetration 195 may be related to the amount of current applied to the workpiece 120 during the welding process. The indentation depth 200 may refer to the depth of the recess formed in the first portion 125 and the second portion 130 of the workpiece 120 after the first portion 125 and the second portion 130 have been heated as part of the welding process. The heat-affected zone width 205 may represent the width of the heat-affected zone, which may be defined as the portions of the workpiece 120 affected by the welding process, and in particular, the heat generated during the welding process, but not melted. The width 210 of the aluminum nugget 135 and the height of the aluminum nugget 135 defined by the penetration 195 attributes discussed above may define a fusion zone 140. Other attributes not illustrated in FIG. 2 may include the magnitude of the current or voltage applied to the workpiece 120. These attributes, however, may be determined or estimated from other attributes that are shown in FIG. 2, such as penetration 195 and the width 210 of the aluminum nugget 135.

Various components of the system 100 may be used to acquire the attributes shown in FIG. 2. As mentioned above, for instance, a force transducer or servo motor may be configured to measure attributes associated with force, position, or size. Examples of such attributes may include indentation width 190, indentation depth 200, and HAZ width 205. A current coil may be configured to measure the magnitude of the current applied to the workpiece 120 during the welding process. Current may be used to measure or estimate penetration 195, width 210 of the aluminum nugget 135, or both. A voltmeter may be configured to measure the magnitude of the voltage applied to the workpiece 120 during the welding process.

Figure 3:
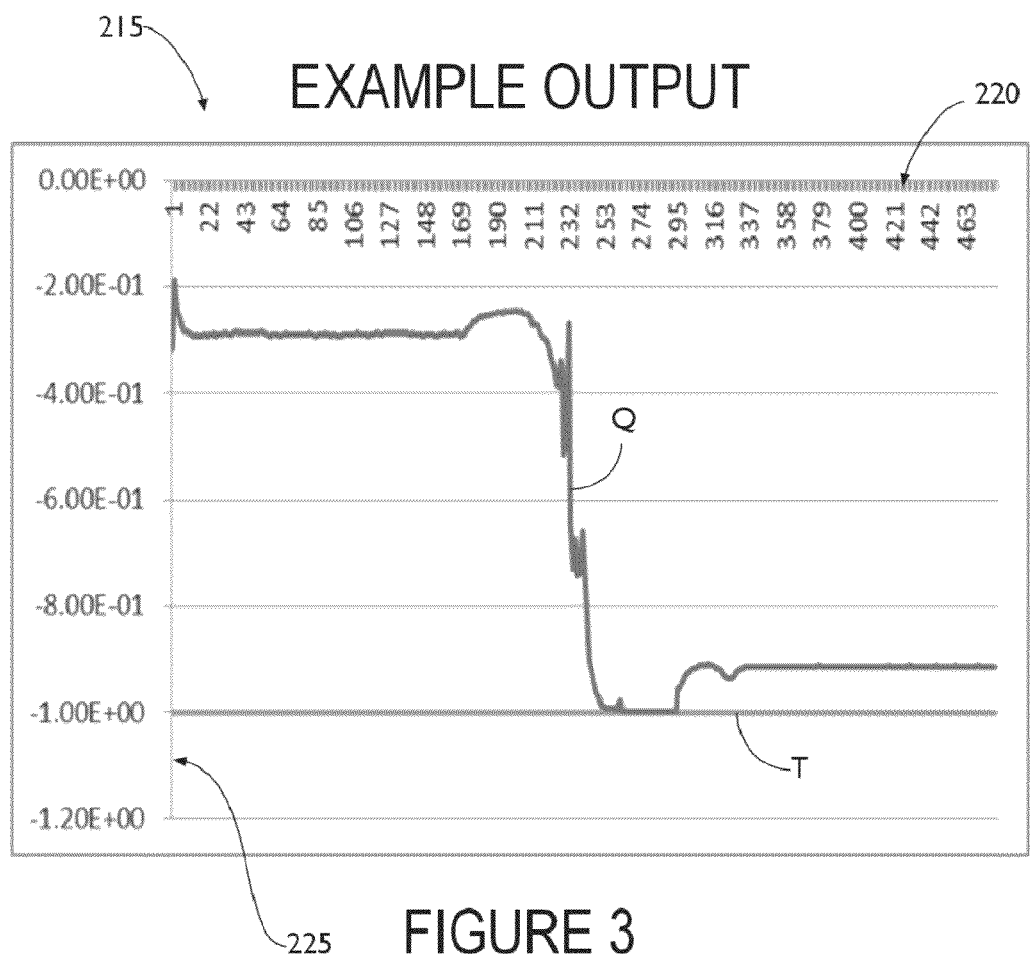
FIG. 3 is a graph of an example output of the processing device shown in FIG. 1.

FIG. 3 is a graph 215 of an example output of the processing device 115 shown in FIG. 1. Time, in milliseconds, is shown along the X axis 220 and the output of the processing device 115, and in particular the dynamic neural network 185, is shown along the Y axis 225. The line Q represents the quality of the aluminum weld over time and the line T represents the lowest possible quality determination. In the example graph 215 of FIG. 3, the line T remains relatively constant at negative one (−1).

In the example graph 215, the output of the processing device 115, shown at line Q, represents a poor aluminum weld because the quality is a negative number (e.g., around −0.2 and −0.3 for about the first 220 milliseconds, as illustrated). After 220 milliseconds and before 253 milliseconds, the quality of the aluminum as determined by the processing device 115 drops significantly to approximately negative one (−1.0). At this point, the processing device 115 may determine that the quality of the aluminum weld cannot be rehabilitated and stop the welding process. Alternatively, as shown in the graph 215 of FIG. 3, the processing device 115 may allow the welding process to continue in case the quality of the aluminum improves without any remedial measure. While the quality, shown by line Q, improves to approximately −0.9, the processing device 115 may determine that this improvement is not sufficient and may reject the weld after a predetermined amount of time, such as 500 milliseconds, or after the end of the welding process.

The graph 215 of FIG. 3 represents a possible output of the processing device 115 where no feedback from the dynamic neural network 185 is considered when controlling the welding machine 105. In instances where feedback from the dynamic neural network 185 is used, the processing device 115 may continuously adjust the operation of the welding machine 105. If feedback were used, the line Q representing quality may gradually increase to a positive number such as, e.g., positive one (+1) throughout the welding process.

In general, computing systems and/or devices, such as the measurement device 110 and the processing device 115, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, and the Mac OS X operating systems distributed by Apple Inc. of Cupertino, Calif. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories, or other data stores may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 4:
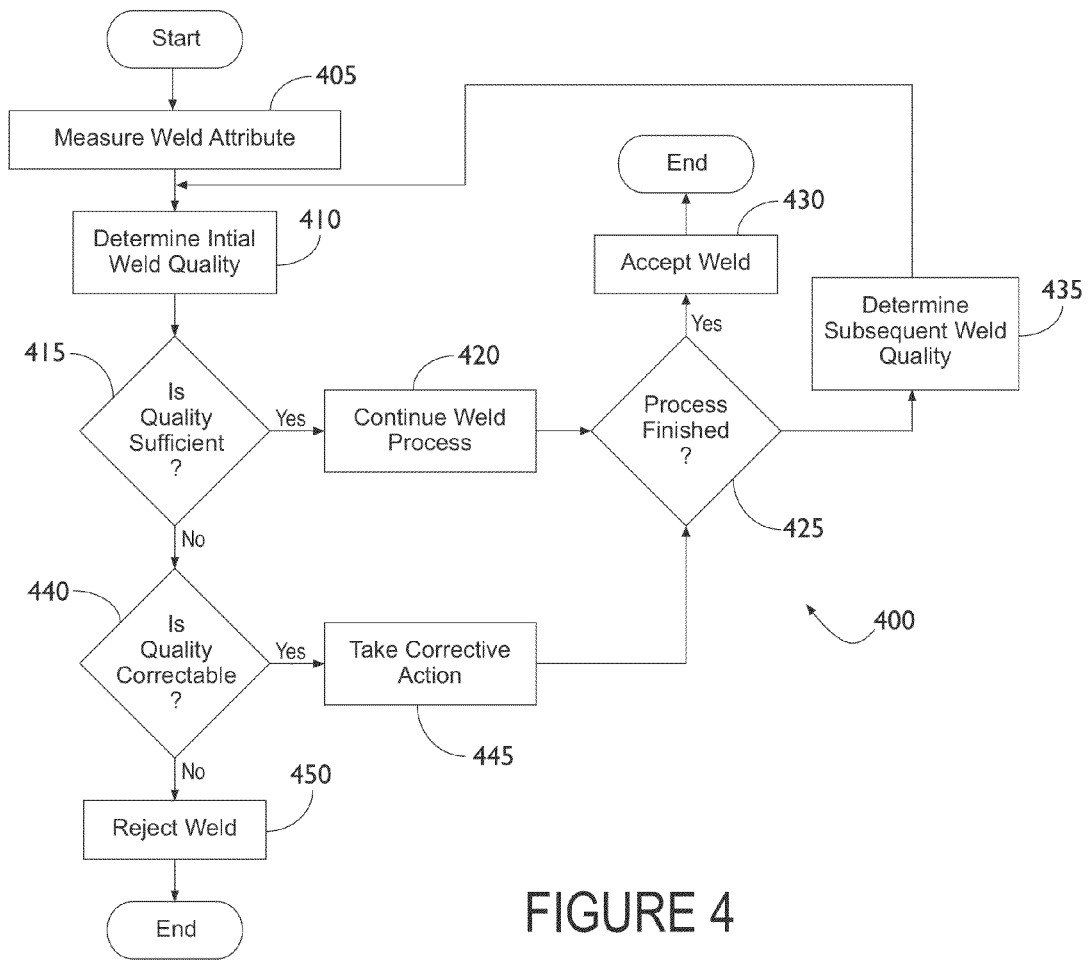
FIG. 4 is a flowchart of an exemplary process that may be implemented by the system of FIG. 1.

FIG. 4 is a flowchart of an exemplary process 400 that may be implemented by the system 100 of FIG. 1. The process 400 may be implemented by any one or more of the components of the system 100 shown in FIG. 1. For instance, certain aspects of the process 400 may be implemented by the processing device 115 while others may be implemented by the measurement device 110.

At block 405, the measurement device 110 may measure one or more attributes of the workpiece 120 or the aluminum nugget 135. Examples of quality attributes may include indentation width 190, penetration 195, indentation depth 200, heat-affected zone (HAZ) width 205, width 210 of the aluminum nugget 135, welding force, expulsion, thermal expansion, and the magnitude of the current or voltage applied to the workpiece 120 during the welding process. These attributes may be measured using one or more sensors or other components. For instance, the measurement device 110 may include a force transducer or servo motor configured to measure attributes associated with force, position, or size. Examples of such attributes may include indentation width 190, indentation depth 200, and HAZ width 205. A current coil may be configured to measure the magnitude of the current applied to the workpiece 120 during the welding process. Current may be used to measure or estimate penetration 195, width 210 of the aluminum nugget 135, or both. A voltmeter may be configured to measure the magnitude of the voltage applied to the workpiece 120 during the welding process. The measurement device 110 may generate and output signals representing measurements of one or more of these or other attributes.

At block 410, the processing device 115 may make an initial quality determination and output the weld quality signal representing the initial determination. The initial quality determination may represent the quality of the aluminum weld relatively early in the welding process. In some instances, the initial quality determination may be represented as a value from −1 to +1, from 0% to 100%, from zero to a positive integer, or the like. The value may in some cases be represented by the weld quality signal output by the processing device 115.

At decision block 415, the processing device 115 may determine whether the quality determination indicates a weld of sufficient quality. The processing device 115 may determine the sufficiency of the quality of the aluminum weld by comparing the value represented by the weld quality signal to a predetermined threshold. For instance, a weld of sufficient quality may be represented by a positive number (e.g., a number equal to or greater than zero (0)), a percentage equal to or greater than 50%, or a value equal to or greater than a particular positive integer (e.g., three (3)). If the quality of the weld is determined to be sufficient, the process 400 may continue at block 420. If the quality of the weld is determined to be insufficient, the process a400 may continue at decision block 440.

At block 420, the processing device 115 may allow the welding process to continue. That is, the processing device 115 may make no changes to the settings of welding machine 105.

At decision block 425, the processing device 115 may determine whether the welding process is complete. In some implementations, the welding process may be completed after a predetermined amount of time has elapsed. In other implementations, whether the welding process is complete at block 425 may be based on factors independent of time, such as the quality of the aluminum weld or the like. If the welding process is complete, the process 400 may continue at block 430. If the welding process has not been completed, the process 400 may continue at block 435.

At block 430, the processing device 115 may accept the aluminum weld. In one possible approach, the processing device 115 may disable the welding machine 105 and present an operator with an indication that the welding process is complete and that the aluminum weld has been accepted. Moreover, the processing device 115 may output various information about the aluminum weld including, but not limited to, information about the measurements taken at block 405, the determination made at block 410, and any other determination made throughout the process 400, such as the determination made at block 435, discussed below. In some instances, the process 400 may end after block 430.

At block 435, the measurement device 110 may take additional measurements and the processing device 115 may make a subsequent determination about the quality of the aluminum weld based on the new measurements. The process 400 may return to decision block 415 after executing block 435.

At decision block 440, the processing device 115 may determine whether insufficiencies in the quality of the aluminum weld are reversible. That is, the processing device 115 may determine the likelihood that the quality may be improved so that the weld is sufficient for its intended use. If the processing device 115 determines that the quality can be improved, the process 400 may continue at block 445. If the processing device 115 determines that the quality cannot be improved, or that it is unlikely that the quality can be improved, the process 400 may continue at block 450.

At block 445, the processing device 115 may take one or more corrective actions. One example of a corrective action may include adjusting a setting of the welding machine 105. The adjustment made to the welding machine 105 may be based on the underlying cause of the poor quality determination. For instance, if the cause of the poor quality is based on too little penetration 195, the corrective action may include increasing the current through the electrodes 150. The process 400 may continue at block 425 after block 445.

At block 450, the processing device 115 may reject the aluminum weld. Rejecting the weld may include outputting a signal to a weld operator indicating that the weld has been rejected. Moreover, rejecting the aluminum weld may include turning off the welding machine 105 or otherwise stopping the welding process.

The process 400 may end after blocks 430 or 450.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An aluminum welding system comprising:
   a welding machine configured to weld a workpiece with an aluminum nugget;
   a measurement device configured to electrically measure a plurality of attributes of the aluminum nugget a plurality of times during a welding process; and
   a processing device programmed to continuously output, during the welding process, a weld quality signal representing a real-time quality of an aluminum weld based at least in part on the attributes measured and control the welding machine according to the weld quality signal continuously output during the welding process.

2. The system of claim 1, wherein the processing device includes a dynamic neural network configured to update the real-time quality of the aluminum weld represented by the weld quality signal at predetermined intervals of time during the welding process.

3. The system of claim 1, wherein the real-time quality of the aluminum weld represented by the weld quality signal represents a real-time likelihood that the quality of the aluminum weld meets at least one predetermined criterion.

4. The system of claim 1, wherein the processing device is configured to iteratively determine the real-time quality of the aluminum weld over a predetermined period of time during the welding process and continuously output the weld quality signal representing each real-time quality of the aluminum weld determined from the plurality of attributes.

5. The system of claim 1, wherein the plurality of attributes includes indentation width, indentation depth, and heat-affected zone width, and wherein the processing device is configured to:
   iteratively determine the real-time quality of the weld based on the plurality of attributes; and
   continuously generate the weld quality signal during the weld process based at least in part on the real-time quality of the weld determined at each iteration.

6. The system of claim 1, wherein the processing device is configured to control operation of the welding machine in accordance with real-time quality of the aluminum weld represented by the weld quality signal to improve a quality of the aluminum weld in real time during the welding process and before expulsion.

7. The system of claim 6, wherein improving the quality of the aluminum weld in real time includes the processing device adjusting a setting of the welding machine, during the welding process, if one of the real-time qualities of the aluminum weld represented by weld quality signal represents a poor weld.

8. The system of claim 6, wherein the processing device is configured to reject the weld if at least one of the real-time qualities of the aluminum weld represented by the weld quality signal is below a predetermined threshold.

9. The system of claim 8, wherein the processing device is configured to predict, during the welding process, whether the quality of the aluminum weld can be improved.

10. The system of claim 9, wherein the processing device is configured to reject the aluminum nugget if the quality of the aluminum weld is not predicted to improve during a remainder of the welding process.

11. An aluminum welding system comprising:
    a welding machine configured to weld a workpiece with an aluminum nugget;
    a measurement device configured to electrically measure a plurality of attributes of the aluminum nugget during a welding process; and
    a processing device configured to generate and continuously output, during the welding process, a weld quality signal representing a real-time quality of an aluminum weld based at least in part on the attributes measured and control operation of the welding machine based at least in part on the weld quality signal continuously output during the welding process,
    wherein the processing device includes a dynamic neural network configured to update the real-time quality of the aluminum weld represented by the weld quality signal and wherein the real-time quality of the aluminum weld represented by the weld quality signal represents a real-time likelihood that the quality of the aluminum weld meets at least one predetermined criterion.

12. The system of claim 1, wherein the measurement device includes a current coil configured to measure a magnitude of a current applied during the welding process.

13. The system of claim 12, wherein the plurality of attributes includes at least one of penetration and width of the aluminum nugget during the welding process, and wherein the processing device is programmed to generate the weld quality signal based at least in part on measurements of at least one of the penetration and width of the aluminum nugget iteratively performed during the welding process.

14. The system of claim 1, wherein the measurement device includes a voltmeter configured to measure a magnitude of a voltage applied during the welding process, and wherein the processing device is programmed to generate the weld quality signal based at least in part on measurements, iteratively performed during the welding process, of the magnitude of the voltage applied.

15. The system of claim 11, wherein the measurement device includes a current coil configured to measure a magnitude of a current applied during the welding process.

16. The system of claim 15, wherein the plurality of attributes includes at least one of penetration and width of the aluminum nugget during the welding process, and wherein the processing device is programmed to generate the weld quality signal based at least in part on measurements of at least one of the penetration and width of the aluminum nugget iteratively performed during the welding process.

17. The system of claim 11, wherein the measurement device includes a voltmeter configured to measure a magnitude of a voltage applied during the welding process, and wherein the processing device is programmed to generate the weld quality signal based at least in part on measurements, iteratively performed during the welding process, of the magnitude of the voltage applied.

* * * * *